United States Patent [19]
Hattersley et al.

[11] Patent Number: 5,278,963
[45] Date of Patent: Jan. 11, 1994

[54] PRETRANSLATION OF VIRTUAL ADDRESSES PRIOR TO PAGE CROSSING

[75] Inventors: John R. Hattersley, Saugerties, N.Y.; Thomas D. Kim, Highland Park, N.J.

[73] Assignee: International Business Machines Corporation, Armonk, N.Y.

[21] Appl. No.: 718,739

[22] Filed: Jun. 21, 1991

[51] Int. Cl.$^5$ .............................................. G06F 12/10
[52] U.S. Cl. .............................. 395/400; 364/DIG. 1; 364/256.3; 364/254.3; 395/425
[58] Field of Search ............... 364MS/200MS, 900MS; 395/400, 425

[56] References Cited

U.S. PATENT DOCUMENTS

| | | | |
|---|---|---|---|
| 3,786,427 | 1/1974 | Schmidt et al. | 395/425 |
| 3,839,706 | 10/1974 | Borchsenius | 395/400 |
| 4,228,504 | 10/1980 | Lewis et al. | 395/275 |
| 4,520,439 | 5/1985 | Liepa | 395/425 |
| 4,577,274 | 3/1986 | Ho et al. | 395/425 |
| 4,722,047 | 1/1988 | Chan et al. | 395/400 |
| 4,903,194 | 2/1990 | Houdek et al. | 395/575 |
| 5,134,698 | 7/1992 | Imamura et al. | 395/425 |

*Primary Examiner*—Joseph L. Dixon
*Assistant Examiner*—Matthew Kim
*Attorney, Agent, or Firm*—Robert L. Troike; Floyd A. Gonzalez

[57] ABSTRACT

An address translation mechanism for generating real addresses, within a page. Based on stride from a beginning translated address in the page. However, whenever there is a page crossing, an address must go to either the directory look aside table (DLAT) or buffer control element (BCE) to translate a virtual page-address to a real page-address. To avoid the delay this usually causes, the address translation request is sent out before the address is actually needed. This is done by predicting the next page-crossing while real addresses with the current page are being generated based on the stride value. The prediction is based on the stride value, operand size, and page mode.

10 Claims, 4 Drawing Sheets

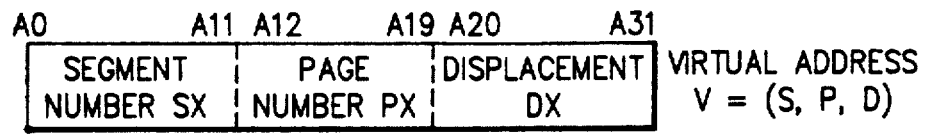
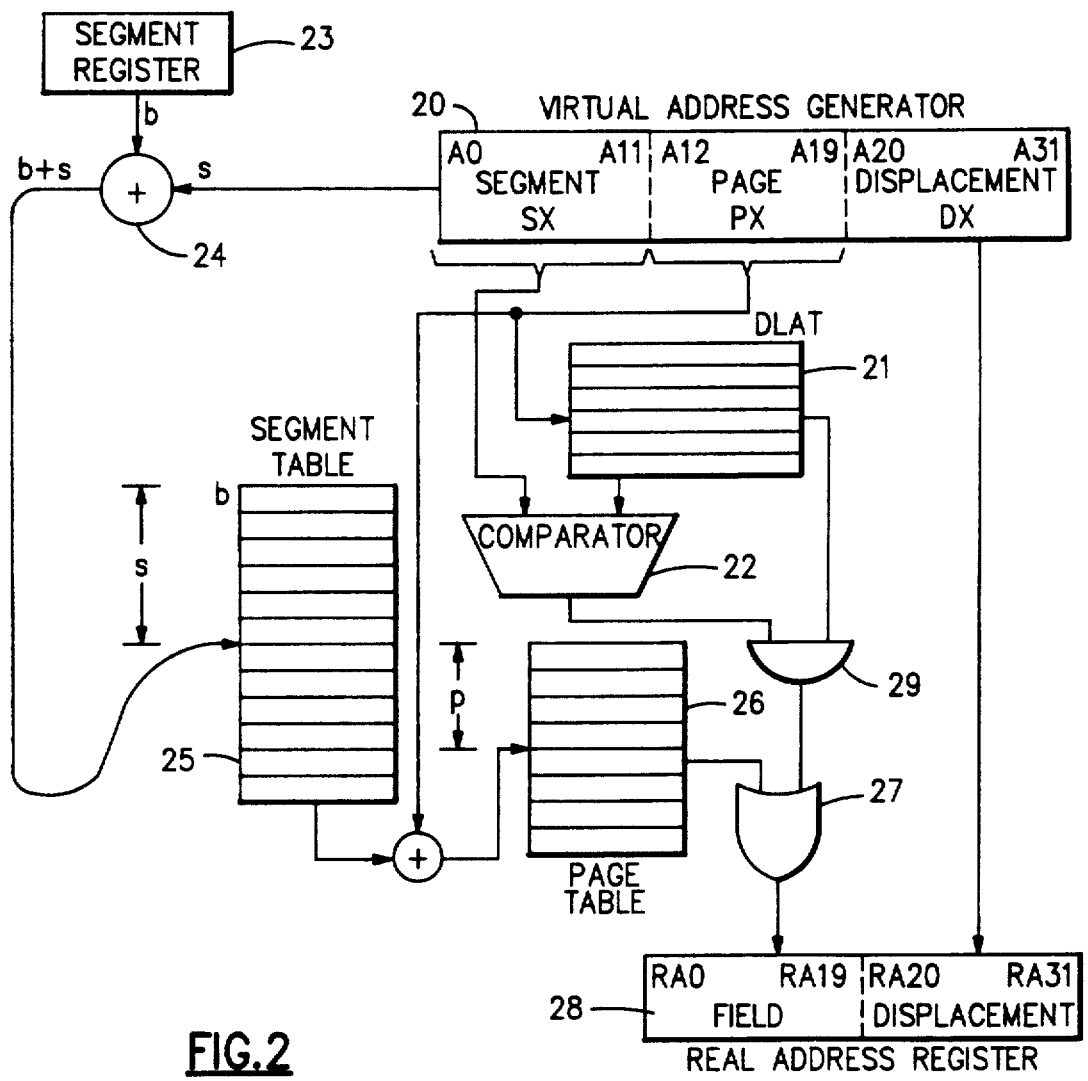
FIG.1
Prior Art
FIG.2
Prior Art

[1]

PRETRANSLATION OF VIRTUAL ADDRESSES PRIOR TO PAGE CROSSING

BACKGROUND OF THE INVENTION

1. Field of the Invention

The present invention generally relates to virtual storage mechanisms for data processing systems and, more particularly, to an address translation mechanism which predicts page-crossings and translates page-addresses ahead of time.

2. Description of the Prior Art

Virtual storage organization and management for data processing systems are described, for example, by Harvey M. Deitel in An Introduction to Operating Systems, Addison-Wesley (1984), by Harold Lorin and Harvey M. Deitel in Operating Systems, Addison-Wesley (1981), and by Harold S. Stone in High-Performance Computer Architecture, Addison-Wesley (1987). In a virtual storage system, paging is a relocation and address-to-physical-location binding mechanism providing the user of the system with what appears to be a considerably larger memory space than is really available. The key feature of the virtual storage concept is disassociating the addresses referenced in a running process from the addresses available in main storage. The addresses referenced by the running process are called virtual addresses, while the addresses available in main storage are called real addresses. The virtual addresses must be mapped into real addresses as the process executes, and that is the function of the dynamic address translation (DAT) mechanism. One such mechanism employs a directory look aside table (DLAT), sometimes referred to as a translation lookaside buffer (TLB), which stores recent virtual address translations. For virtual addresses stored in the DLAT, the translation process requires only a single or, at most, a couple of machine cycles. For addresses not stored in the DLAT, the DAT process may take from fifteen to sixty cycles or more.

Translations from the virtual address to the real address must be made to find where the addressed instruction or data is in main memory. This is typically done on a page basis. In fact, the translations stored in the DLAT are actually only page translations, and the last bits of an address are the location in that page, so only the page address must be translated. Often, the addresses are in a specific order as in scientific computing where the addresses are at specific increments in memory. These increments are called a "stride". If all addresses are in incremental order, the stride is one, but if every other address is used, the stride is two, and so forth. This permits easy prediction of future addresses. In scientific or vector computing, an instruction specifies a starting address, the stride and number of operands in the instruction. This allows the address generation to increment the earlier translated address by the stride to obtain the next address thereby avoiding the overhead of address translation within a page. However, whenever a page-crossing is encountered, the next address must go to the DLAT or buffer control element (BCE) to translate a virtual page-address to a real page-address as before. Thus, there is the potential on a page-crossing for a DLAT "miss" which will cause a delay of thirty cycles or more.

SUMMARY OF THE INVENTION

It is therefore an object of the present invention to provide an improved virtual address translation mechanism which predicts a page-crossing and performs an address translation for the first virtual address within the next page before that translation is actually required.

According to the invention, real addresses are generated based on a stride value from a beginning translated address in a page. To avoid the translation delay usually caused by a page-crossing, the request for address translation for the first virtual address within the next page is sent out before the address is actually needed. This is done by predicting the next page-crossing while real addresses within the current page are being generated based on the stride value. The prediction is based on the stride value, operand size, and page mode, either 4K or 1M in the preferred embodiment.

BRIEF DESCRIPTION OF THE DRAWINGS

The foregoing and other objects, aspects and advantages will be better understood from the following detailed description of a preferred embodiment of the invention with reference to the drawings, in which:

FIG. 1 is a block diagram illustrating the format of a virtual address;

FIG. 2 is a block diagram of a conventional dynamic address translation structure capable of translating (at most) one address per processor cycle;

DETAILED DESCRIPTION OF A PREFERRED EMBODIMENT OF THE INVENTION

Figure 3:
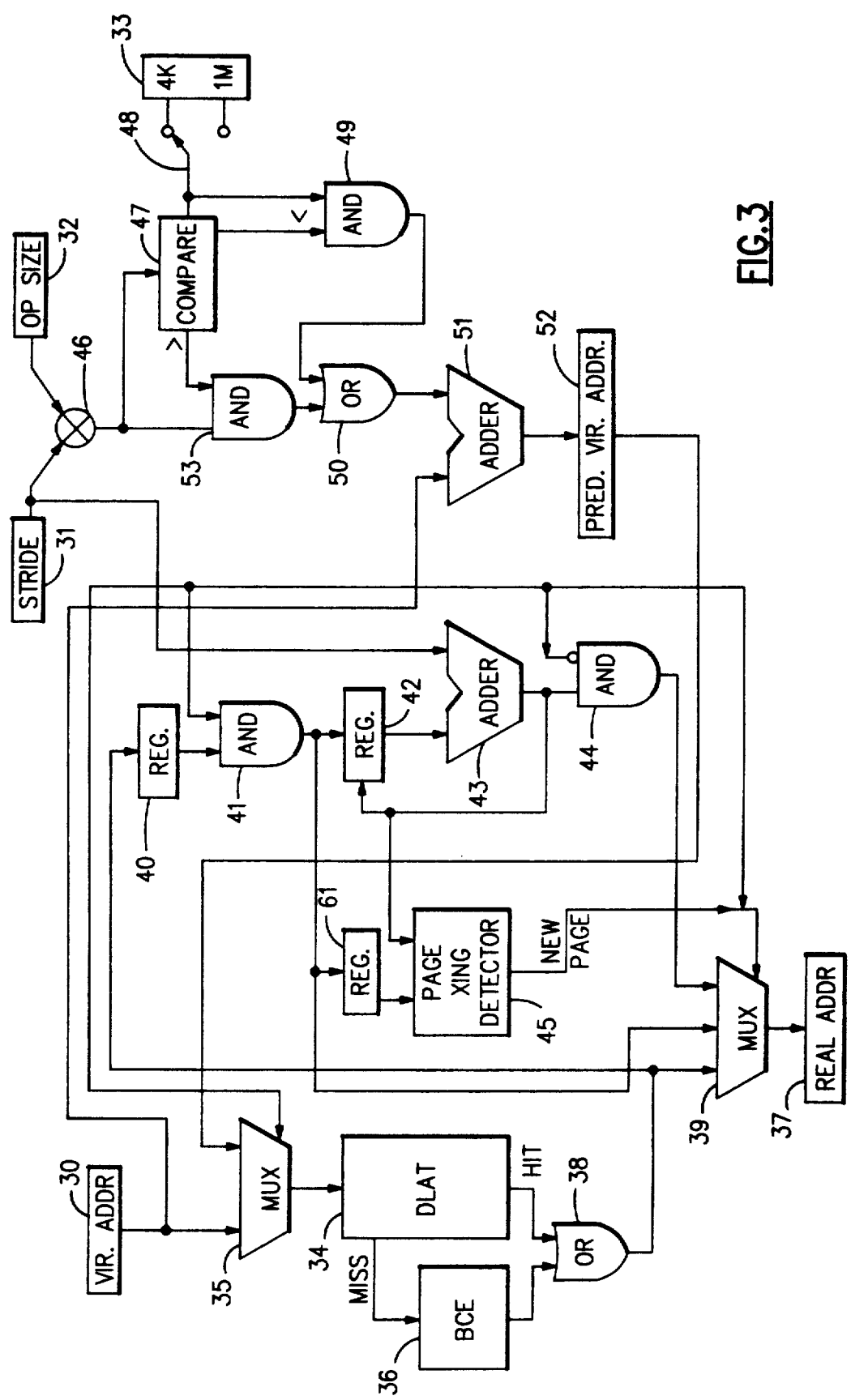
FIG. 3 is a block diagram of the pagecrossing predictive virtual address translation mechanism according to a preferred embodiment of the invention.

The description which follows uses the term "DLAT" for dynamic look-aside table, but those skilled in the art will understand that this term may be used interchangeably with "TLB" for translation look-aside buffer. For purposes of the following description, a paging/segmentation virtual address system is assumed. In such systems, the virtual address format is as shown in FIG. 1 and comprises s-bits for the segment index (SX), p-bits for the page index (PX), and d-bits for the displacement index (DX). The virtual address may be, for example, 32 bits of which bits $A_0$ through $A_{11}$ comprise the segment bits, bits $A_{12}$ through $A_{19}$ comprise the page bits, and bits $A_{20}$ through $A_{31}$ comprise the displacement bits.

As shown in FIG. 2, the virtual address is generated by address generator 20. The address generator 20 is part of a central processing unit (CPU) (not shown). The most recently referenced pages have entries in the DLAT 21. For a DLAT with 256 congruence classes, bits $A_{12}$ through $A_{19}$ of the virtual address are used to address the DLAT. The virtual page identification bits from the addressed entry read out of the DLAT 21 are compared in comparator 22 with bits A1 through A11 of the virtual address. If there is no match, a DLAT miss has occurred. On a DLAT miss, address translation is obtained through, for example, a segment/page table search and placed in the DLAT. The structure which performs this search is referred to as the buffer control element (BCE).

The segment/page table search begins by adding the value in the segment table origin register 23 and the bits $A_0$ to $A_{12}$ of the virtual address in adder 24 to obtain an index value for the segment map table 25. The entry output from the segment map table 25 is, in turn, used as an index for the page map table 26 entry, there being a separate page map table for each segment. The entry output from the page map table 26 provides the page frame at which the virtual page resides in real storage and is passed by OR gates 27 and concatenated with the displacement bits $A_{20}$ through $A_{31}$ of the virtual address generator 20 to form the real address in real address register 28.

On the other hand, if there is a match in the DLAT 21, the comparator 22 enables AND gate 29 which passes the entry output from the DLAT 21 to OR gate 27. In this case, the entry output from the DLAT 21 is the associated real address field which is concatenated to the displacement bits $A_{20}$ through $A_{31}$ to form the real storage address in register 28. Obviously, this process of address translation is considerably faster than that of the segment/page table search which occurs on a DLAT miss. The segment/page table search may take fifteen to eighty cycles to complete, whereas a DLAT access can be completed in one cycle.

Normally, most address translation requests are made by a search of the DLAT, and while the segment/page table search takes a greater number of processor cycles than making the translation by means of the DLAT, the segment/page table search is itself not without the possibility of a translation failure. For example, the segment is not in primary or main storage, causing the operating system to locate the segment on secondary storage, i.e., a direct access storage device (DASD), create a page table for the segment, and load the appropriate page into primary storage, possibly replacing an existing page in the process.

Even if the segment is in primary storage, the desired page may not be in primary storage, causing the operating system to locate the page on secondary storage and loading the page in primary storage, again possibly replacing an existing page in the process. The process of accessing secondary storage can take up to several hundred processor cycles.

The foregoing description is for a conventional DLAT structure intended to make (at most) one translation per processor cycle. The subject invention modifies this structure to start the next page address translation after the first address in a current page is translated from a virtual address to a real address. The real addresses which follow in the current page are generated using a stride value allowing the address generator to begin the next page address translation immediately. In most cases, the next page translation will be available before it is needed and, in the worst case, it is started earlier that it would be under normal mode. This invention also allows for more than one address generator to use the DLAT as the DLAT has available time.

With specific reference to FIG. 3, the starting address of a vector instruction, for example, is stored in register 30. The stride value and operand size are stored in registers 31 and 32, respectively. The page mode, where the option of multiple size pages is implemented, is selected by register 33. In the preferred embodiment 4 K byte and 1 M byte pages are supported. The starting virtual address from register 30 is sent to the DLAT 34 via multiplexer 35 to generate the first real address of a page. If there is a DLAT miss, the BCE 36 performs the address translation, as described with reference to FIG. 2. In either case, the translated real address is read into the real address register 37 via OR gate 38 and multiplexer 39. Where the real address translation is made by the BCE 36, the translated address is read into the DLAT 34 to be available for a future translation.

Except for the multiplexers 35 and 39, the structure thus far described is a simplified version of the address translation mechanism shown in FIG. 2. For vector processing especially and for certain scalar processing operations, the DLAT 34 is bypassed after the initial real address for a page is generated. The initial real address for the page from OR gate 38 is read into register 40 from where it is gated by AND gate 41 into register 42. The stride value in register 31 is added to the initial real address in register 42 by adder 43, and the sum is stored in register 42. This succession of real addresses are passed by AND gate 44 and multiplexer 39 to the real address register 37. Thus, within a page, address generation is performed by the stride adder 43, freeing the DLAT 34.

On a page crossing, as detected by page crossing detector 45, AND gate 44 is inhibited to prevent the output of adder 43 from being supplied to the real address register 37. Instead, the output of OR gate 38 is selected by multiplexer 39 to be supplied to the real address register 37. At the same time, AND gate 41 is enabled by the page crossing detector 45 to read the real address temporarily stored in register 40 into registers 42 and 61 and to multiplexer 39 as the initial real address for the new page.

Figure 4:
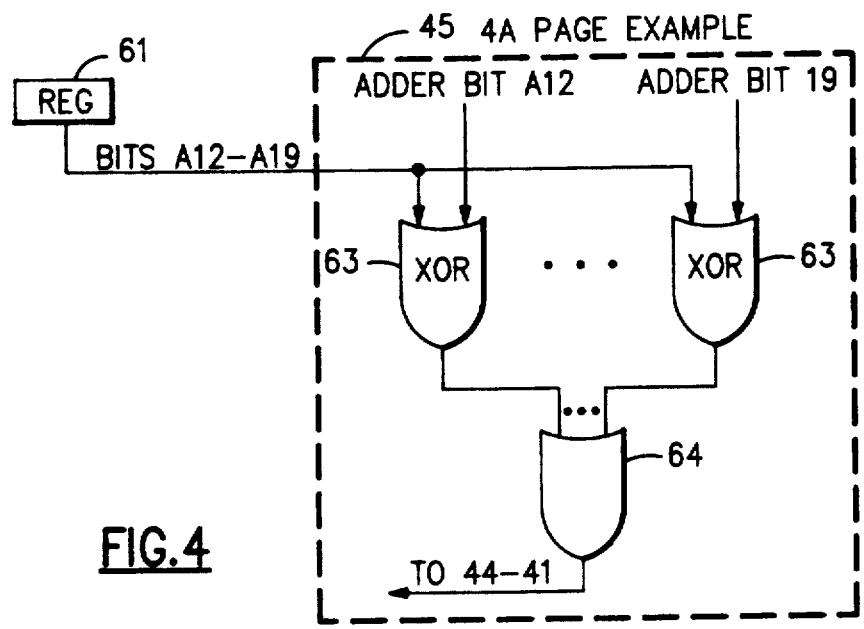
FIG. 4 is a logic diagram page crossing detector used in the mechanism shown in FIG. 3.

The page crossing detector 45 receives as its inputs the output from adder 43 and the contents of a register 61. Register 61 is loaded from register 40 via AND gate 41 at the same time register 42 is loaded, but register 61 is not changed until the page changes. As shown in FIG. 4, the logic of the page crossing detector 45 Exclusive ORs bits with the address generated by adder 43 to determine if the page has changed. In the example illustrated, a 4 K page is assumed, and the address bits involved are $A_{12}$ to $A_{19}$. The outputs of the Exclusive OR gates 63 are combined in OR gate 64 to generate the outputs to AND gates 41 and 44.

The invention takes advantage of this structure and the resulting idle time of the DLAT 34 to generate the initial real address in the next page of memory to be accessed and/or to allow multiplexer 39 to be used by more than one address generator. The stride value in register 31 is multiplied in multiplier 46 by the operand size in register 32. The product from multiplier 46 is input to comparator logic 47 to determine how much the starting address should be incremented. For example, if the page size is 4 K bytes as selected by switch 48 and the stride times the number of bytes in the operand size is less than 4 K bytes, then AND gate 49 is enabled by comparator 47 to pass the value 4 K to the adder 51 via OR gate 50. The adder 51 adds the value 4 K to the virtual address stored in virtual address register 30. Thus, the starting address is incremented by 4 K bytes to obtain the next virtual page address which is temporarily stored in predicted virtual address register 52. If, in this example, the stride value times the operand size is greater than 4 K bytes, AND gate 53 is enabled by comparator 47 and the starting virtual address is incremented by the product output from multiplier 46 to obtain the next page virtual address.

The result is sent to the DLAT 34 via multiplexer 35 for normal processing and entry into the DLAT so that it is ready for the translation when it is needed. This process can go on in parallel with the normal address generation process. It is also given a lower priority to allow the normal DLAT translations to take place with no interruptions.

Figure 5:
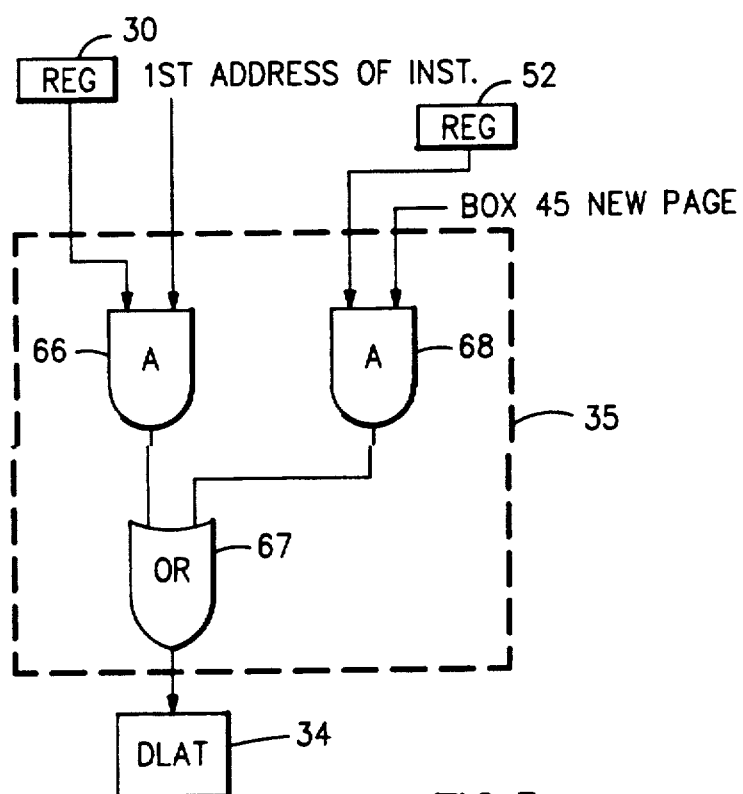
FIG. 5 is a logic diagram of one of the multiplexers used in the mechanism shown in FIG. 3.

FIG. 5 shows the logic of the multiplexer 35. AND gate 66 passes the virtual address in register 30 to the DLAT 34 via OR gate 67 when enabled by a first address of instruction signal. AND gate 68 passes the predicted virtual address from register 52 to the DLAT 34 via OR gate 67 when enabled by an output from the new page detector 45.

Figure 6:
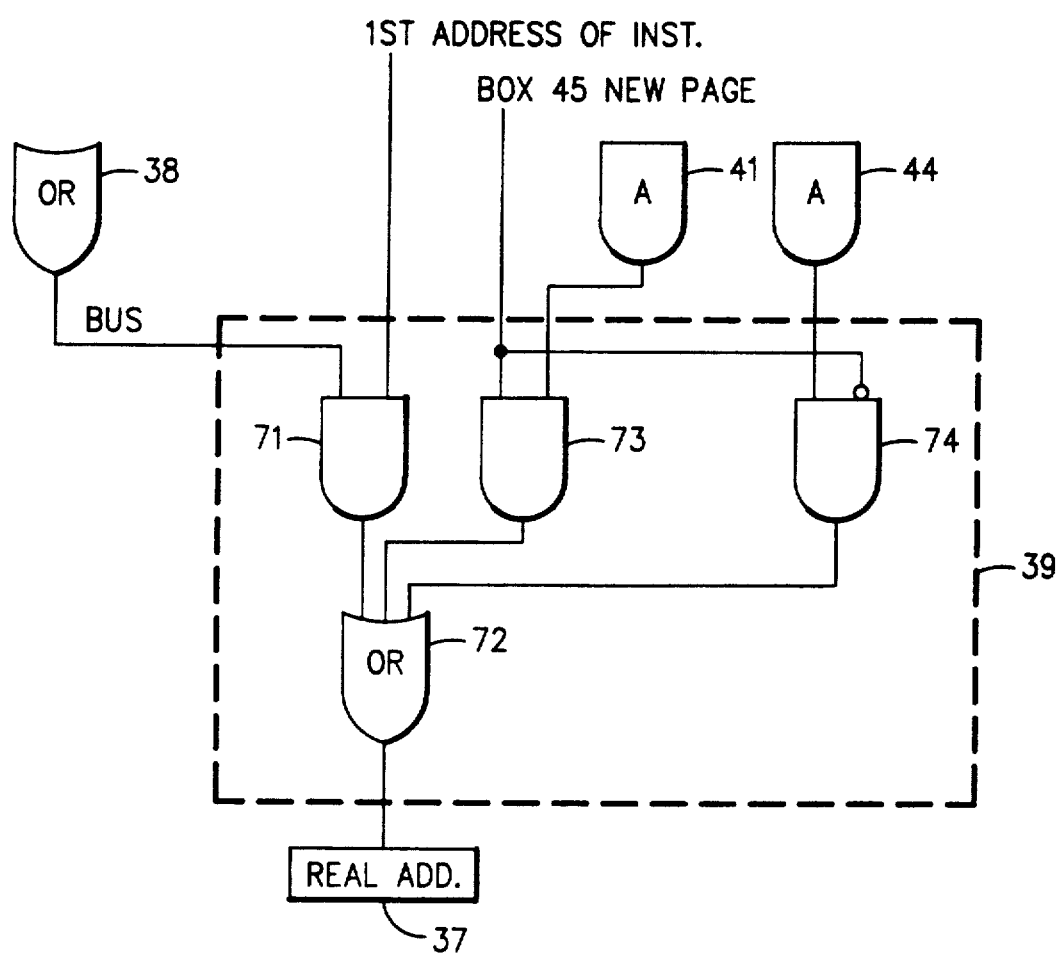
FIG. 6 is a logic diagram of another of the multiplexers used in the mechanism shown in FIG. 3.

FIG. 6 shows the logic of the multiplexer 39. AND gate 71 passes the output of OR gate 38 to the real address register 37 via OR gate 72 when enabled by the first address of instruction signal. AND gate 73 passes the output of AND gate 41 to the real address register 37 via OR gate 72 when enabled by the output of the page crossing detector 45. The output of the page crossing detector 45 inhibits the output of AND gate 74 which otherwise passes the output of AND gate 44 to the real address register 37 via OR gate 72. Thus the multiplexer 39 allows the first translated address of the instruction to go to the real address register 37. It then uses the output of AND gate 44 to provide addresses to register 37 until there is a page crossing, in which case the output of AND gate 41 is used.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. An address translation mechanism for a data processing system comprising:
    means for storing a beginning real-page address within a page corresponding to a first generated virtual address;
    means for storing a stride value and an operand size value representing a predetermined operand size;
    means, coupled to said beginning real-page address storing means and said stride value and operand size value storing means, for generating real-page addresses within said page by successively adding said stride value to said beginning real-page address;
    means, coupled to said means for generating real-page addresses, for predicting a page crossing by generating a new virtual address for a new beginning real-page address on another page based on an addition of said first generated virtual address and one of a product output of the stored stride value multiplied by the stored operand size value, and a predetermined page size; and
    means, coupled to said means for predicting said page crossing, for pretranslating said new virtual address prior to said page crossing.

2. The address translation mechanism as recited in claim 1 wherein said means for predicting said page crossing comprises:
    means for multiplying said stored stride value and the stored operand size value to generate the product output;
    means for comparing said product output with said predetermined page size;
    means responsive to said comparing means for selecting one of said product output and said predetermined page size as an addend output; and
    adder means for adding said addend output and said generated first virtual address to produce said new virtual address.

3. The address translation mechanism recited in claim 2 wherein said means for pretranslating said new virtual address comprises dynamic address translation means, said dynamic address translation means also generating said beginning real-page address within said page corresponding to said first generated virtual address.

4. The address translation mechanism recited in claim 3 wherein said beginning real-page address corresponding to said first generated virtual address is translated with priority over the pretranslation of said new virtual address.

5. The address translation mechanism recited in claim 2 wherein said means for generating real-page addresses within said page comprises:
    second adder means for receiving as addend inputs said stride value and an accumulated output and generating an output which is a succession of real page addresses within said page; and
    accumulator means for providing said accumulated output, said accumulator means initially being loaded with said beginning real-page address and then receiving said succession of real page addresses.

6. The address translation mechanism as recited in claim 5 wherein said means for generating real-page addresses within said page further comprises:
    page crossing detector means responsive to said beginning real-page address and to the output of said second adder means for detecting said page crossing; and
    means responsive to said page crossing detector means for inhibiting the output of said second adder means.

7. The address translation mechanism recited in claim 2 further comprising:
    means for storing a plurality of page sizes; and
    means for selecting one of said plurality of page sizes, a selected one of said plurality of page sizes being said predetermined page size.

8. A method of address translation in a data processing system comprising the steps of:
    storing a beginning real-page address within a page corresponding to a first generated virtual address;
    storing a stride value and an operand size value corresponding to a predetermined operand size;
    generating real-page addresses within said page by successively adding said stride value to said beginning real-page address;
    predicting a page crossing by generating a new virtual address for a new beginning real-page address on another page based on an addition of said first generated virtual address and one of a product output of the stored stride value multiplied by the stored operand size value, and a predetermined page size; and
    pretranslating said new virtual address prior to said page crossing.

9. The method of address translation recited in claim 8 wherein said step of predicting said page crossing comprises the steps of:

multiplying said stored stride value and the stored operand size value to generate the product output;

comparing said product output with said predetermined page size;

selecting one of said product output and said predetermined page size as an addend output; and adding said addend output and said first generated virtual address to produce said new virtual address.

10. The method of address translation recited in claim 9 further comprising the steps of:

storing a plurality of page sizes; and selecting one of said plurality of page sizes, a selected one of said plurality of page sizes being said predetermined page size.

* * * * *